Feb. 18, 1930.  H. J. BLAKESLEE  1,747,217

ELECTRIC METER CONNECTION

Filed March 16, 1929

Inventor,
Henry J. Blakeslee
by Harry R. Williams
Atty.

Patented Feb. 18, 1930

1,747,217

UNITED STATES PATENT OFFICE

HENRY J. BLAKESLEE, OF MARLBORO, CONNECTICUT

ELECTRIC-METER CONNECTION

Application filed March 16, 1929. Serial No. 347,610.

This invention relates to means for mounting alternating current and direct current, two and three wire electric meters, in the location of their use, and making the necessary connections with the line wires, or with the service boxes containing the main switches and safety fuses.

The object of the present invention is to provide a simple, inexpensive and efficient means whereby the mere act of placing the meter on its support in the locality in which it is to be used makes the necessary electrical connections. The meters in common use have terminal chambers that usually extend from the bottom, and which contain the means for connecting the circuit wires. The present invention eliminates terminal chambers, and obviates the necessity of making independent connections with the circuit wires, thus enabling the meters to be installed very quickly.

This object is attained by providing a panel or block with conducting studs to which the service wires are attached, which panel or block is designed to be fastened to or built into the surface upon which the meter is to be placed, either out of or indoors as the case may be, by the electricians who install the line conductors, and providing the meter with conducting sleeves or sockets that are electrically connected with the metering mechanism, and that are adapted to receive the studs.

With this arrangement the meter installer is simply required to thrust the meter into place against the panel or supporting surface, with the conducting studs projecting into the sockets, the studs not only supporting the meter proper but also making the required electrical connections through the sockets with the metering mechanism when the meter is placed in position of use. After the meter is thus placed the studs are preferably expanded so that the meter cannot be withdrawn until the stud expanding means are loosened. The fixed studs and sockets in the meter are so located that when the usual cover is placed over the meter and is sealed, the studs and sockets are covered. This construction enables considerable reduction in the size of the meter casing, both as to height and depth, and saves much time in the installation of the meter.

Figure 1:
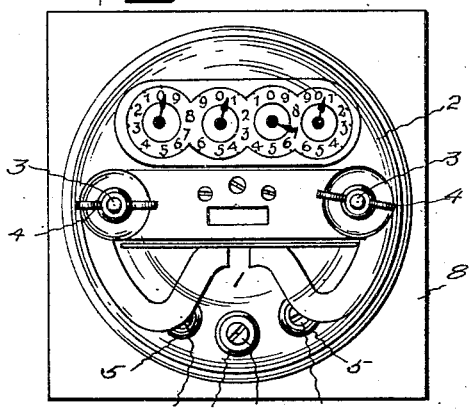
Figure 2:
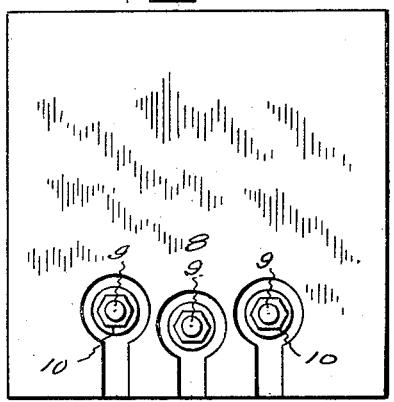
Figure 3:
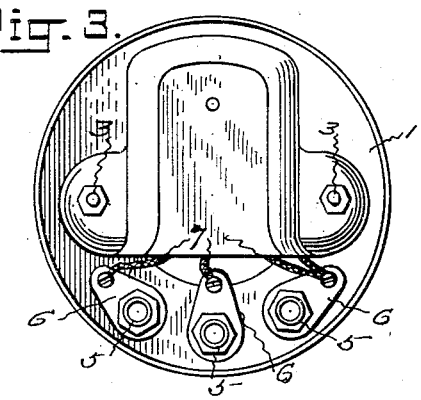
Figure 4:
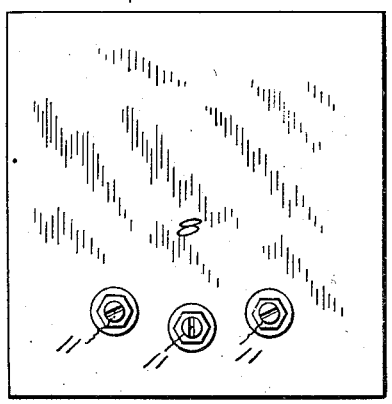
Figure 5:
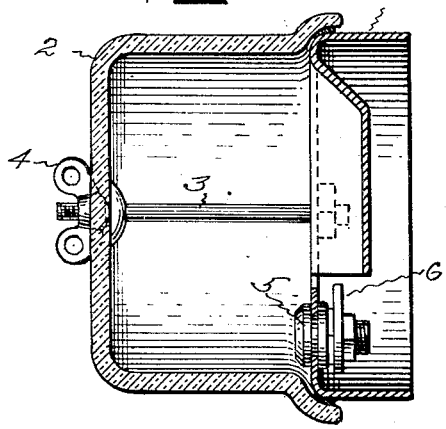
Figure 6:
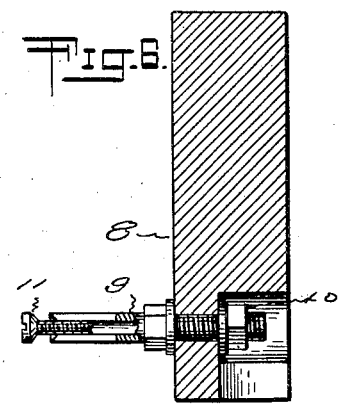

In the accompanying drawings Fig. 1 shows a front view of a meter and the panel to which the meter is fastened by means of this invention. Fig. 2 is a view looking at the back of the panel. Fig. 3 is a back view of the meter proper with the panel removed. Fig. 4 is a front view of the panel. Fig. 5 is a section of the meter case, the metering mechanism being omitted. Fig. 6 is a section of the panel and one of the fixed studs.

The meter casing which is preferably circular in outline, and which may contain the usual A. C. or D. C. metering mechanism, comprises a base 1, and a cover 2 held to the base by screws 3 and thumb nuts 4, which nuts are usually sealed after the cover has been placed in position. As the metering mechanism forms no part of the present invention it is not illustrated and described in detail. In the base of the meter near the lower edge are fastened conducting sleeves or sockets 5, the openings through which extend from front to back through the base. These sockets are provided with fingers 6 for the attachment of the lead wires 7 of the measuring mechanism.

The block or panel 8 upon which the meter is to be placed may be made of any suitable material, and in the lower portion of this panel conducting studs 9 are fixed, these studs being the same in number as the sockets in the meter base, and located in such positions that when the meter is placed against the face of the panel, the studs will project into and preferably through the sockets in the meter base. At the back the studs are provided with binding nuts 10 for the attachment of the circuit wires, or wires from the switch and fuse box, which is usually installed in connection with the meter. The front ends of the studs are preferably bored out and slitted so that the studs will be capable of expansion. These openings in the studs are threaded and expanding screws 11 are screwed therein. After the meter has been thrust upon the studs the screws are turned in so as to expand the ends of the studs against the walls of the sockets in order to ensure close electrical contacts and also at the same time bind the parts together, making it practically impossible to withdraw the meter from the studs when the screws are turned in.

With this construction the panel or block, may be fixed in position by the electrician that installs the wires of the system, and then when it is desired to place the meter in service the meter installer merely brings the meter and thrusts it upon the studs, tightens the expanding screws and then seals the meter cover in place. The studs not only make the required electrical connections, but they support and hold the meter so that it cannot be removed after the studs have been expanded and the cover has been sealed over the meter mechanism. There being no projections from the meter proper, it is convenient to pack and ship by the manufacturer and carry to the place of use by the meter installer. The panel with the studs may be set into the wall by the building contractor if desired. With this construction without the necessity of providing the usual meter chamber, the contacts are readily made from the front, and when made and the cover is sealed on the meter, the supporting contacts cannot be tampered with.

The invention claimed is:

1. An electric meter having a base provided with conducting sockets adapted to be connected with the meter leads, said sockets being open through the base from back to front, and a panel provided with projecting conducting studs corresponding in number to and arranged to pass into said sockets and be accessible from the front when the meter is placed in position of use and concealed when the meter cover is in place.

2. An electric meter having a base provided with conducting sockets adapted to be connected with the meter leads, and a panel provided with forwardly projecting conducting studs which are adapted to be connected with service wires and are arranged to pass into said sockets when the meter is placed in position of use, to complete the electrical connections and support the metering mechanism, said studs having expansible ends, and means for expanding the ends of the studs when they are in the sockets to prevent the removal of the meter from the studs.

3. An electric meter having a base provided with conducting sockets adapted to be connected with the meter leads, and a panel provided with forwardly projecting conducting studs which are adapted to be connected with service wires and are arranged to pass into said sockets when the meter is placed in position of use, to complete the electrical connections and support the metering mechanism, said studs having threaded expansible ends, and screws turned into the ends of the studs for expanding them.

4. An electric meter having a base provided with conducting sockets adapted to be connected with the meter leads, and a panel provided with forwardly projecting conducting studs which are adapted to be connected with service wires and are arranged to pass into said sockets when the meter is placed in position of use, to complete the electrical connections and support the metering mechanism, said studs having threaded expansible ends, screws turned into the ends of the studs for expanding them, and a cover enclosing the metering mechanism and preventing access to said sockets, studs and screws, when in place.

5. An electric meter having a base provided with conducting sockets adapted to be connected with the meter leads, said sockets being open through the base from back to front, a panel provided with projecting conducting studs corresponding in number to and arranged to pass into said sockets and be accessible from the front when the meter is placed in position of use, and means adapted to engage the ends of said studs for locking them in said sockets and thereby securing the meter in place.

6. An electric meter having a base provided with conducting sockets adapted to be connected with the meter leads, said sockets being open through the base from back to front, a panel provided with forwardly projecting studs arranged to pass in to said sockets and provided a support for the meter and an electrical connection therewith, and means accessible from the front of the meter when the cover is removed for preventing the withdrawal of the sockets from the studs.

7. An electric meter having a base provided with conducting sockets adapted to be connected with the meter leads, said sockets being open through the base from back to front, a panel provided with forwardly projecting studs arranged to pass into said sockets and form a support for the meter and an electrical connection therewith, and means accessible from the front of the meter when the cover is removed for preventing the withdrawal of the sockets from the studs, said means being inaccessible when the meter cover is secured in place.

HENRY J. BLAKESLEE.